US011084952B2

(12) United States Patent
Soucek et al.

(10) Patent No.: US 11,084,952 B2
(45) Date of Patent: Aug. 10, 2021

(54) FUNCTIONALIZED POLYMER COMPOSITIONS FOR LOW VOC COALESCENCE OF WATER BASED EMULSIONS

(71) Applicants: The University of Akron, Akron, OH (US); SWIMC LLC., Cleveland, OH (US)

(72) Inventors: Mark Soucek, Akron, OH (US); Anisa Cobaj, Copley, OH (US); Brian Makowski, Reminderville, OH (US)

(73) Assignees: SWIMC, LLC, Cleveland, OH (US); The University of Akron, Akron, OH (US)

( * ) Notice: Subject to any disclaimer, the term of this patent is extended or adjusted under 35 U.S.C. 154(b) by 201 days.

(21) Appl. No.: 16/387,806

(22) Filed: Apr. 18, 2019

(65) Prior Publication Data

US 2019/0322890 A1  Oct. 24, 2019

Related U.S. Application Data

(60) Provisional application No. 62/659,317, filed on Apr. 18, 2018.

(51) Int. Cl.
| | | |
|---|---|---|
| *C09D 133/14* | (2006.01) | |
| *C08F 220/34* | (2006.01) | |
| *C09D 133/06* | (2006.01) | |
| *C09D 7/61* | (2018.01) | |
| *C08F 220/14* | (2006.01) | |
| *C08K 3/22* | (2006.01) | |
| *C09D 5/02* | (2006.01) | |

(52) U.S. Cl.
CPC ........ *C09D 133/062* (2013.01); *C08F 220/14* (2013.01); *C08K 3/22* (2013.01); *C09D 5/022* (2013.01); *C09D 7/61* (2018.01); *C08F 2800/10* (2013.01); *C08F 2800/20* (2013.01); *C08K 2003/222* (2013.01); *C08K 2003/2241* (2013.01); *C08K 2003/2296* (2013.01)

(58) Field of Classification Search
CPC .. C09D 133/14; C09D 133/10; C09D 133/12; C09D 133/06; C09D 5/022; C08F 220/343
See application file for complete search history.

(56) References Cited

U.S. PATENT DOCUMENTS

| | | | | |
|---|---|---|---|---|
| 4,246,391 A * | 1/1981 | Watson, Jr. | ........ | C08G 18/8175 525/404 |
| 4,652,274 A * | 3/1987 | Boettcher | ................ | B24D 3/30 51/298 |
| 8,084,561 B2 * | 12/2011 | Kim | ........................ | A61Q 19/00 526/219.5 |
| 9,353,204 B2 * | 5/2016 | Hase | ..................... | C08F 120/14 |
| 2002/0050228 A1 | 5/2002 | Towe | | |
| 2006/0106157 A1 * | 5/2006 | Sawant | .............. | C08G 18/6229 524/589 |
| 2008/0279809 A1 * | 11/2008 | Hackbarth | ................ | C09D 5/08 424/78.32 |
| 2009/0047443 A1 * | 2/2009 | Bowman | .............. | C09D 181/00 427/553 |
| 2011/0077334 A1 * | 3/2011 | Oi | ...................... | C08G 18/6254 524/264 |
| 2012/0259065 A1 * | 10/2012 | Sommer | .............. | C08G 18/672 524/591 |
| 2016/0280807 A1 * | 9/2016 | Soucek | ................. | C08F 220/18 |

FOREIGN PATENT DOCUMENTS

| | | | | |
|---|---|---|---|---|
| CA | 2061446 A1 | 8/1993 | | |
| JP | 63162768 A * | 7/1988 | ............... | C09D 3/80 |
| WO | 1992021720 A1 | 12/1992 | | |
| WO | 2014097309 A1 | 6/2014 | | |
| WO | 2017127708 A1 | 7/2017 | | |
| WO | 2018071801 A1 | 4/2018 | | |

OTHER PUBLICATIONS

JP-63162768-A(Jul. 6, 1988); machine translation. (Year: 1988).*
Extended European Search Report for European Application No. 19169739.0.

* cited by examiner

*Primary Examiner* — Rip A Lee
(74) *Attorney, Agent, or Firm* — Renner, Kenner, Greive, Bobak & Weber (57) ABSTRACT

A coating composition is described that has good film forming and blocking properties in a composition that also has low or no VOCs. The coating compositions herein include functionalized urethane (meth)acrylate polymers that allow better film formation and particle coalescence while maintaining the low or no VOC levels. In one aspect, the coating compositions include functionalized polymers with a higher glass transition temperature (Tg) to aid in achieving good block resistance but a low minimum film forming temperature (MFFT) to achieve good particle coalescence and film formation all while being substantially free of co-solvents, coalescent aid and/or plasticizers.

19 Claims, 4 Drawing Sheets

FUNCTIONALIZED POLYMER COMPOSITIONS FOR LOW VOC COALESCENCE OF WATER BASED EMULSIONS

CROSS-REFERENCE TO RELATED APPLICATIONS

The present invention claims priority to U.S. Provisional Application Ser. No. 62/659,317, filed Apr. 18, 2018.

FIELD

This application generally relates to water based or latex emulsions functionalized with urethane (meth)acrylate monomers to improve coalescence of higher glass transition temperature polymers with a lower overall minimum film forming temperature.

BACKGROUND

Water-based coatings and paints are often considered inferior to so-called solvent-based systems that include organic solvents rather than water. The superiority of solvent-based coatings and paints is mainly due to the quality of the formed film. The polymers in solvent-based systems are dissolved in the organic solvent and, therefore, tend to result in uniform films upon solvent evaporation. Water-based coatings and paints, on the other hand, typically include polymer particles in water that tend to undergo a coalescence step in order to form a film. In many cases, this coalescence is incomplete without the aid of a co-solvent, plasticizer, or coalescing agent to help soften latex particles enabling them to fuse and form a continuous film. However, the added solvents, plasticizer, or coalescing agents may, in some instances, detract from film performance and/or contribute to increased volatile organic compounds ("VOC") of the coatings. It is often desired to minimize VOC levels in coatings and paints.

Coatings and paints that include polymer systems with higher glass transition temperatures (Tg) are desired in some applications because they tend to provide better hardness, chemical resistance, dry time, and block resistance to suggest a few desired benefits of the higher Tg polymers. However, higher Tg polymers usually require organic solvents or high amounts of the co-solvents in order to adequately form a good film. Alternatively, heating the coating and film above the Tg tends to aid in forming a good film, but such approach is often inconvenient and generally not an option in the consumer coating and paint industry. Thus, water-based coatings are often limited to the use of lower Tg, softer polymers when incorporated within a low VOC formulation.

Lower Tg polymers in water-based coatings, and especially low VOC water-based coatings, can in some instances result in low block resistance of the coating. Blocking is the undesirable adhesion between two painted surfaces, between paint and another surface (such as weather stripping), or between painted surfaces of a door and door jamb, for instance. The paint can stick to itself or to the weather stripping when a window or door is opened and can leave bare patches of substrate. Water-based coatings and paints, especially low VOC water-based coatings and paints, often include the low Tg polymers as noted above, which can result in films with a low bock resistance. Thus, coating and paint manufacturers are often faced with a dilemma when developing products designed for high block resistance—either formulate an organic solvent-based composition with the shortcoming of higher VOCs or, if a water-based formulation is needed, include co-solvents, plasticizers, or coalescent aids that enhance film formation but run counter to the desire to have a low VOC, water-based formulation.

SUMMARY

The present disclosure describes a low VOC latex coating composition for improved coalescence of water based emulsions. In one aspect, the low VOC latex coating composition includes a polymer obtained from monomers including one or more of a vinyl acetate monomer, an alkyl(meth)acrylate monomer, a styrenic monomer or combinations thereof together with a urethane (meth)acrylate monomer. The urethane (meth)acrylate monomer provides about 4 to about 15 percent sterically available hydrogen bonding sites per urethane (meth)acrylate monomer. The polymer has a glass transition temperature as measured by differential scanning calorimetry of about 17° C. or greater and a minimum film forming temperature of about 12° C. or lower at the same time. The low VOC latex coating composition also includes water and the low VOC latex coating composition is substantially free of co-solvents, plasticizers, coalescence aids, and mixtures thereof.

The low VOC latex coating composition of the previous paragraph may also be combined with one or more optional features in further embodiments or approaches. For example, the low VOC latex coating composition may further include wherein the urethane (meth)acrylate monomer provides about 2 to about 9 percent sterically available hydrogen bonding sites per urethane (meth)acrylate monomer and that are spaced 1 to 4 carbon atoms from a terminal end of the urethane (meth)acrylate monomer; and/or wherein the coating composition, when dry, forms a homogeneous film at the minimum film forming temperature of about 12° C. or lower and being substantially free of the co-solvents, plasticizers, coalescence aids, and mixtures thereof at least in part from a coalesced polymer network including hydrogen bonding of amide nitrogen to carbonyl oxygen between polymer particles therein; and/or wherein the urethane (meth)acrylate monomer has the formula wherein R is hydrogen or a methyl group, $R_1$ is an alkylene chain with 1 to 10 carbons, and $R_2$ is an alkyl chain with 1 to 4 carbons or an alkyl carbamate having an alkyl endcap with 1 to 4 carbons; and/or wherein the $R_2$ groups are a linear alkyl chain; and/or wherein the low VOC latex coating composition has less than about 0.5 weight percent of the co-solvents, plasticizers, coalescence aids, and mixtures thereof; and/or wherein the polymer includes about 2 to about 20 mol percent of the urethane (meth)acrylate monomer units; and/or wherein $R_2$ is an alkyl carbamate moiety of the formula wherein $R_3$ is an alkylene chain with 1 to 6 carbons and $R_4$ is an alkyl chain with 1 to 4 carbons;

and/or wherein the urethane (meth)acrylate monomer has the formula wherein R is hydrogen or a methyl group, $R_1$ is an alkylene chain with 1 to 10 carbons, $R_3$ is an alkylene chain with 1 to 6 carbons and $R_4$ is an alkyl chain with 1 to 4 carbons; and/or wherein the urethane (meth)acrylate monomer has the formula wherein R is hydrogen or a methyl group, $R_1$ is an alkylene chain with 1 to 10 carbons, and $R_4$ is an alkyl chain with 1 to 4 carbons; and/or wherein the urethane (meth)acrylate monomer has the formula wherein R is hydrogen or a methyl group, and $R_4$ is an alkyl chain with 1 to 4 carbons; and/or wherein the polymer has a glass transition temperature as measured by differential scanning calorimetry of about 17 to about 40° C. and a minimum film forming temperature of about 0 to about 12° C.; and/or wherein a difference between the glass transition temperature as measured by differential scanning calorimetry and the minimum film forming temperature is at least about 5° C.; and/or wherein a difference between the glass transition temperature as measured by differential scanning calorimetry and the minimum film forming temperature is about 5° C. to about 40° C.; and/or wherein the latex coating has a VOC of about 5 g/L or less; and/or wherein the polymer includes the vinyl acetate monomer, the alkyl (meth)acrylate monomer, and the urethane (meth)acrylate monomer; and/or wherein the polymer includes about 2 to about 20 mol percent of the urethane (meth) acrylate monomer, about 20 to about 97 mol percent of the alkyl (meth) acrylate monomer, and about 20 to about 90 mol percent of the vinyl acetate and/or styrenic monomer; and/or wherein the polymer further includes about 0.2 to about 10 mol percent acrylic acid; and/or wherein a dried coating thereof exhibits a blocking resistance of 4 or higher as measured by ASTM D4946-89.

In another aspect or embodiment, the present disclosure also provides a low VOC latex coating composition for improved coalescence of water based emulsions where the low VOC latex coating composition includes a polymer obtained from monomers including one or more of a vinyl acetate monomer, an alkyl (meth)acrylate monomer, a styrenic monomer or combinations thereof together with a urethane (meth)acrylate monomer. In one approach of this aspect, the urethane (meth)acrylate monomer has the formula wherein R is hydrogen or a methyl group, $R_1$ is an alkylene chain with 1 to 10 carbons, $R_3$ is an alkylene chain with 1 to 6 carbons and $R_4$ is an alkyl chain with 1 to 4 carbons.

The low VOC latex coating composition of the previous paragraph may also be combined with one or more optional features in further embodiments or approaches. For example, wherein the urethane (meth)acrylate monomer provides about 4 to about 15 percent of sterically available hydrogen bonding sites per urethane (meth)acrylate monomer; and/or wherein the polymer has a glass transition temperature as measured by differential scanning calorimetry of about 17° C. or greater and a minimum film forming temperature of about 12° C. or lower at the same time; and/or wherein the low VOC latex coating composition is substantially free of co-solvents, plasticizers, coalescence aids, and mixtures thereof; and/or wherein the coating composition, when dry, forms a homogeneous film at the minimum film forming temperature of about 12° C. or lower and being substantially free of co-solvents, plasticizers, coalescence aids, and mixtures thereof at least in part by a coalesced polymer network including amide nitrogen to carbonyl oxygen hydrogen bonds between polymer particles therein; and/or wherein the low VOC latex coating composition has less than about 0.5 weight percent of co-solvents, plasticizers, coalescence aids, and mixtures thereof; and/or wherein the polymer includes about 2 to about 20 mol percent of the urethane (meth)acrylate monomer units; and/or wherein $R_3$ is a linear or branched 6 carbon chain; and/or wherein $R_1$ is an ethylene moiety; and/or wherein the polymer has a glass transition temperature as measured by differential scanning calorimetry of about 17 to about 40° C. and a minimum film forming temperature of about 0 to about 12° C.; and/or wherein the latex coating has a VOC of about 5 g/L or less; and/or wherein the polymer includes the vinyl acetate monomer or styrenic monomer, the alkyl (meth) acrylate monomer, and the urethane (meth)acrylate monomer; and/or wherein the polymer includes about 2 to about 20 mol percent of the urethane (meth) acrylate monomer, about 20 to about 97 mol percent of the alkyl (meth)acrylate monomer, and about 20 to about 90 mol percent of the vinyl acetate and/or styrenic monomer; and/or wherein the polymer further includes about 0.2 to about 10 mol acrylic acid; and/or wherein a dried coating thereof exhibits a blocking resistance of 4 or higher as measured by ASTM D4946-89.

DETAILED DESCRIPTION

A coating composition, such as a water-based emulsion or latex coating, is described that has good film forming and blocking properties in a composition that also has low or no VOCs. The coating compositions herein include functionalized (meth)acrylate polymers that allow better film formation and particle coalescence while maintaining the low or no VOC levels. In one aspect, the coating compositions include functionalized polymers, such as urethane (meth) acrylate functionalized polymers, with added monomers to achieve high glass transition temperatures (Tg) to aid in good block resistance but also a low minimum film forming temperature (MFFT) at the same time to achieve good particle coalescence and film formation all while being substantially free of co-solvents, coalescent aids and/or plasticizers. With the high glass transition temperatures, it was unexpected that the latex coatings herein would form homogeneous films with such low MFFT without substantial levels of co-solvents, plasticizers, and/or coalescence aids because it was previously understood that high levels of such additives were needed to achieve good films in latex coatings including high Tg polymers.

As discussed in the Background, high Tg polymers that provided good block resistance, hardness, and chemical resistance typically required organic solvents or, if used in a water-based system, with added co-solvents, plasticizers, and/or coalescent aids in order to achieve good film formation. Discovered herein, on the other hand, are latex coatings or water-based emulsions that include functionalized (meth) acrylate polymers and monomers therefor that achieve good particle coalescence for film formation with low MFFTs and good blocking resistance with a high Tg polymer(s) at the same time. This is achieved without the need for organic solvents or substantial levels of co-solvents, plasticizers, and coalescent aids.

In another aspect, the compositions herein include a functionalized (meth)acrylate polymer obtained from monomers including one or more of a vinyl acetate monomer, an alkyl (meth)acrylate monomer, a styrenic monomer, or combinations thereof together with a urethane (meth)acrylate monomer. The functionalized polymer includes randomly copolymerized monomer units of such monomers.

In some approaches, the urethane (meth)acrylate monomer provides about 4 to about 15 percent sterically available hydrogen bonding sites per monomer. The polymer has a high glass transition temperature as measured by differential scanning calorimetry of about 17° C. or greater and a low minimum film forming temperature of about 12° C. or lower at the same time. The low VOC latex coating composition also includes water and, as discussed above, is substantially free of co-solvents, plasticizers, coalescence aids, and mixtures thereof.

Figure 3A:
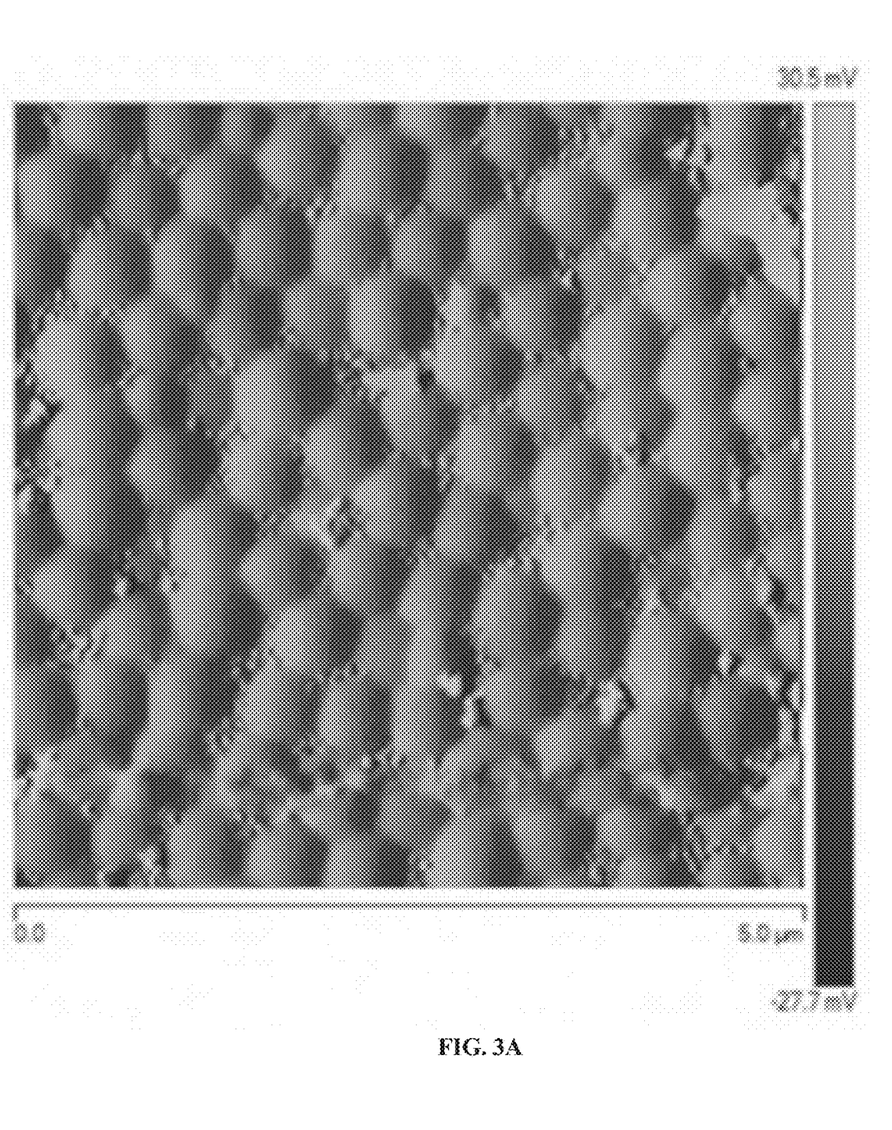
FIGS. 3A-3C include phase-imaging atomic force microscopy (AFM) of polymers herein shown relative to a control polymer without a urethane (meth)acrylate; the y-axis thereof providing the phase shift of the AFM measurement.
Figure 3B:
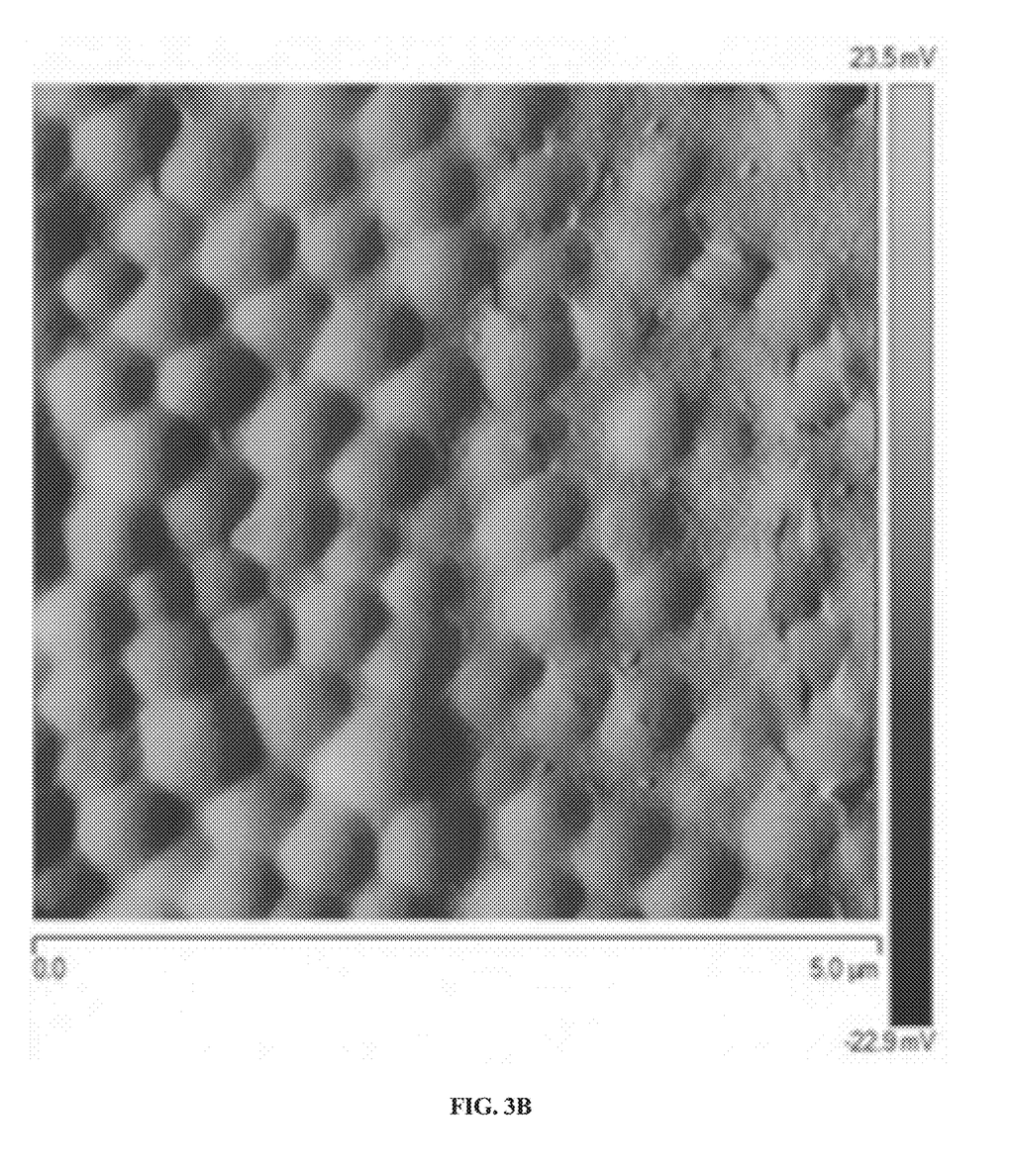
Figure 3C:
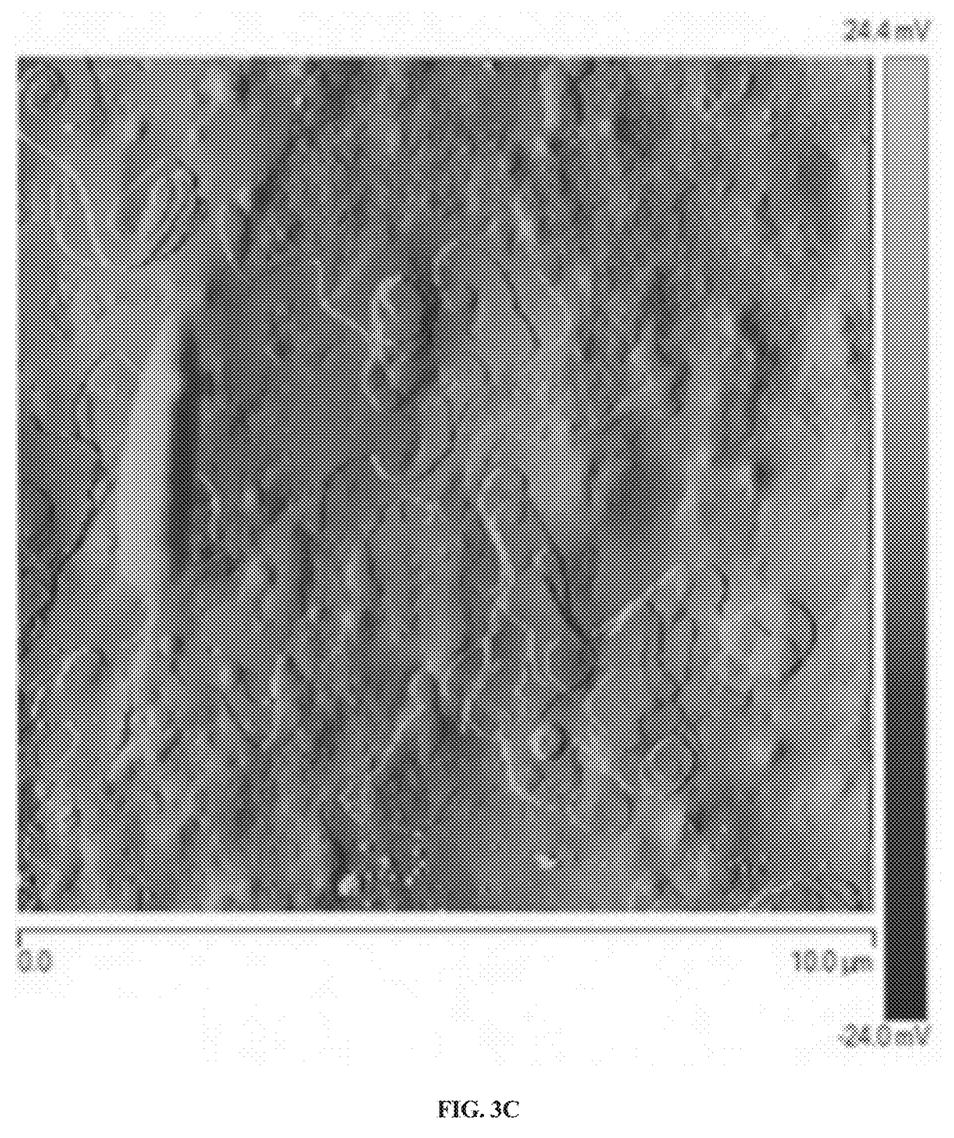

In further approaches, the urethane (meth)acrylate monomer may provide about 2 to about 9 percent sterically available hydrogen bonding sites that are spaced 1 to 4 carbon atoms from a terminal end of the monomer or monomer unit in the polymer. The coatings herein, surprisingly, form a homogeneous film, as shown in the exemplary images of FIG. 3, at the minimum film forming temperature of about 12° C. or lower and being substantially free of the co-solvents, plasticizers, coalescence aids, and mixtures thereof at least in part due to a coalesced polymer network including amide nitrogen to carbonyl oxygen hydrogen bonds between polymer particles therein. As discussed further herein, the hydrogen bonding sites are sterically available for bonding between polymer particles and, without wishing to be limited by theory, help achieve the surprisingly homogenous film formation upon drying without the presence of the co-solvents, plasticizers, and/or coalescence aids.

As used herein, when a monomer or monomer mixture is described, this disclosure also refers to the associated monomer unit or repeating unit when polymerized and vice versa. As also used herein, "(meth)acrylate" monomer(s) or monomer unit(s) refers to either an acrylate monomer or monomer unit, a methacrylate monomer or monomer unit, or mixture(s) thereof. Generally, the polymers herein are formed through polymerization across carbon-carbon double bonds in the respective monomer units.

Certain terminology is used herein for convenience only and is not to be taken as a limitation on the present invention. Relative language used herein is best understood with reference to the drawings (if any), in which like numerals are used to identify like or similar items. Further, in the drawings, certain features may be shown in somewhat schematic form.

It is also to be noted that the phrase "at least one of," if used herein, followed by a plurality of members herein means one of the members, or a combination of more than one of the members. For example, the phrase "at least one of a first component and a second component" means in the present application: the first component, the second component, or the first component and the second component combined. Likewise, "at least one of a first component, a second component, and a third component" means in the present application: the first component, the second component, the third component, the first component and the second component, the first component and the third component, the second component and the third component, or the first component and the second component and the third component. Similar combinations of larger listings of components are also possible.

Glossary of Terms

"Opacity" or hiding (in some approaches) as used herein generally refers to the ability of a film to scatter light based on the thickness of the film. The Opacity is often expressed as S/mil and may be in the form of Kubelka-Munk scattering coefficients as determined using a modification of ASTM D 2805-70 as described in J. E. Mchutt and H. L. Ramsay in American Paint and Coatings Journal, April, 1988, p. 46 by the weight drawdown method, which is incorporated herein by reference.

"Opaque Polymer" as used herein generally refers to a polymeric network that encloses or substantially encloses a defined void volume. In some embodiments an Opaque Polymer comprises polystyrene. Opaque polymers are commercially available from commercial vendors. Exemplary commercially available Opaque Polymers are Ropaque Ultra EF or Ropaque OP-96 EF (both available from the Dow Chemical Company, Midland, Mich.). In certain embodiments the defined volume of an Opaque Polymer comprises air forming a void that scatters light. For embodiments including a liquid within the defined volume, the liquid is eventually replaced with air, creating a void that scatters light. Opaque polymers may be used as a partial replacement for $TiO_2$ in paints or other coatings to enhance hiding and whiteness in paints and coatings.

"Pigment Volume Concentration" or "PVC" as used herein refers to a number that represents the volume of pigment (e.g., opaque polymer, titanium dioxide, and/or extender pigment particles) compared to the volume of all solids. In the field of paints and coatings, PVC is a useful measure because the Binder acts as the material to unite all the pigment and other raw materials into the paint and the PVC value ensures there is enough Binder to enable the paint to adhere properly to whatever it has been applied over in addition to containing all of the other components of the paint. If a paint has no pigment at all it will usually be very glossy and have a PVC of zero. An example is clear gloss paints. Flat paints have a very high pigment loading and have high PVCs (usually in the range from about 35% up to about 80%). Another non-limiting exemplary range of PVC in which pigment can be loaded is from about 60% to about 75%. Primers and undercoats vary from 30% to about 50% PVC as do semi-gloss, satin and low sheen paints. PVC may be expressed as a percentage. For example, if a coating has a PVC of 30, then 30% of the total binder and pigment blend is pigment and 70% of the total binder and pigment blend is binder solids on a volume basis.

"Binder" as used herein refers to long chain molecules, or polymers, that are film-forming materials. Binders are generally responsible for gluing or binding coating materials together and to the substrate. Latex polymers are a non-limiting example of a Binder that may be dispersed in water using a dispersant and film formation (or other network formation) occurs by joining (or coalescence) of these solid particles as water evaporates or is otherwise driven off. Exemplary Binders which may be used in the present disclosure include, but are not limited to, polyvinyl acetates, vinyl acrylics, styrene butadiene, styrene acrylics, ethylene vinyl polymers and copolymers or terpolymers as further discussed herein. In some approaches, the copolymers and terpolymers herein function as a paint binder and no further binder is utilized.

"Paint" as used herein refers to any mixture comprising different types of raw materials, each with its own function, which must be balanced to achieve the desired properties in the final product or film coating. The two primary functions of paint are decoration and protection. A paint may contain a solvent (which can include a volatile component derived from a petroleum distillate for a solvent-based paint, or a low VOC, or no-VOC, or water for a water-based paint), a Binder, a pigment, fillers (such as an extender or a plurality of extenders of different sizes) and an additive, which may impart different functionality to the paint or final coating. Embodiments may include a pigment cluster as a component thereof, optionally in combination with at least one of the solvent, Binder, pigment, filler and additive.

"Coatings" as used herein refer to compositions such as paint, stains, lacquers, etc.

"Additives" as used herein refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

"Glass Transition Temperature" or "Tg" generally refers to a temperature region where an amorphous polymer transitions from a hard, glassy material to a softer, rubbery material. Typically this transition is reversible. Tg is measured by differential scanning calorimetry (DSC) and/or dynamic mechanical analysis (DMA), such as with a TA Instruments Q200 differential scanning calorimeter or the like instrument. Preferably, Tg is measured through DSC.

"Minimum Film Forming Temperature" or "MFFT" refers to the lowest temperature at which a polymer self-coalesces to form a continuous polymer film. Temperatures at or above the MFFT of the polymer, a film is formed. Temperatures below the MFFT, the polymer generally cannot coalesce to form a continuous film and typically cannot bind together or bind other components in the paint or coating into a film. MFFT is measured with an apparatus that creates a temperature gradient across a cast film, such as with a Rhopoint MFFT 90 minimum film forming temperature instrument or the like instrument.

"Blocking" or "Block Resistance" generally refers to the ability of a coating or paint, when applied to two opposing surfaces, to resist adhesion to itself or, if applied to a single surface abutting another surface, to resist adhesion to the other surface. It is a measure of the degree of hardness and/or degree of cure of the coating or paint. Blocking or Block Resistance is measured according to ASTM-D4946-89.

"Volatile Organic Compound" or "VOC" generally refers to organic compounds that have a high vapor pressure at room temperature. In many cases, VOCs are compounds with a vapor pressure of greater than about 0.1 mm of Hg. VOC as reported herein is measured according to ASTM D2369-90 and is the weight of the VOC per volume of the coating solids in grams/L. As used herein, low VOC or substantially free of VOCs means less than about 50 g/L, in other approaches, less than about 10 g/L, in yet other approaches, less than about 5 g/L, and in yet other approaches, no VOCs.

Functionalized Polymer

Turning to more of the specifics, the coating compositions herein, which may be water-based emulsions or latex paints, include a functionalized (meth)acrylate polymer obtained from (meth)acrylate monomer(s), urethane (meth)acrylate monomer(s) and, optionally, one or more monomers selected from at least vinyl acetate monomer(s), acrylic monomer(s), styrene monomer(s), the other monomers described below, and mixtures thereof. The functionalized polymer includes randomly copolymerized monomer units of such monomers. Without wishing to be limited by theory, it is believed that the urethane (meth)acrylate monomer(s) impart functionality to the latex polymer by including polar side groups that, when polymerized into a polymer, extend sufficiently from the main polymer backbone and interact with adjacent particles to provide more efficient hydrogen bonding with urethane groups of neighboring particles to facilitate coalescence in the absence of substantial levels of organic solvents, co-solvents, and/or plasticizers.

For example and in one approach, the urethane (meth) acrylate monomers provide about 4 to about 15 percent sterically available hydrogen bonding sources or sites per urethane monomer to the functionalized polymer. In other approaches, the urethane (meth)acrylate monomer provides to the functionalized polymer about 2 to about 9 percent sterically available hydrogen bonding sources or sites that are spaced 1 to 4 carbon atoms or units from a terminal end of the urethane (meth)acrylate monomer or monomer unit. It is believed these hydrogen bonding sources or sites on the urethane (meth)acrylate are positioned in the polymer to provide hydrogen bonding between amide nitrogen (or urethane nitrogen) and carbonyl oxygen between polymer particles of the coating upon drying and/or removal of the water. As used herein, a hydrogen bonding site or source refers at least to an amide or urethane nitrogen. Without wishing to be limited by theory, it is believed that the hydrogen bonding sites may plasticize neighboring particles upon the hydrogen bonding to enable the homogeneous film formation at such low MFFTs discussed herein. In some approaches, the hydrogen bonding sites provided by the urethane or amide nitrogen on the urethane (meth)acrylate monomer units are positioned within the polymer to be sterically available for hydrogen bonding due to, at least in part, the hydrogen bonding sites extending sufficiently away from the polymer backbone (as shown in the structures below), being positioned close to the terminal end of the monomer unit, and/or due to relatively short alkyl chains (which are preferably linear) adjacent to the hydrogen bonding sites on an endcap of the monomer unit in the polymer. The carbonyl oxygen recipient for the hydrogen bonding may be provided by the carbonyl oxygen in any amide group or acrylate group that is preferably located in an adjacent polymer particle.

The functionalized (meth)acrylate polymer may include additional monomer units enabling a higher Tg polymer than normally used in water-based or latex compositions and, surprisingly, permits the polymer to have a lower minimum film forming temperature (MFFT) at the same time to achieve a homogeneous film in terms of surface composition, adhesion, friction, viscoelasticity, and other surface characteristics. In some approaches, the films herein are devoid of or substantially free of any measurable or discrete polymer particles when measured or viewed using atomic force microscopy (AFM). (See, e.g. FIG. 3.) As discussed more below, the polymers herein also exhibit a large temperature differential between the Tg and the MFFT. (See, e.g., FIGS. 1 and 2.) Such divergent polymer properties were previously not possible in water-based or latex paints when high Tg polymers are required.

As used herein, without the need for, without substantial levels of, in the absence of, or substantially free of organic solvent, co-solvents, and/or plasticizers generally means the coating compositions herein have less than about 1 weight percent, in other approaches, less than about 0.5 weight percent, in other approaches, less than about 0.2 weight percent, and in yet other approaches, no co-solvents, plasticizer, and coalescent aids. Such levels refer to each component individually or various total combinations thereof.

In one aspect, the polymers of the present disclosure are formed from and/or include one or more urethane (meth) acrylate monomer(s) and include the associate urethane (meth)acrylate monomer unit(s) in the formed or resultant polymer chain. The urethane (meth)acrylate is a (meth) acrylate monomer with a urethane group. In one approach, the urethane (meth)acrylate monomer and associated monomer unit in the resultant polymer (with the polymer chain formed at the carbon-carbon double bond) has the formula with R being hydrogen if the monomer is an acrylate or a methyl group if the monomer is a methacrylate, $R_1$ is an alkylene or hydrocarbon chain with 1 to 10 carbons (in other approaches, about 1 to 6 carbons, and in yet further approaches, about 4 to about 10 carbons or about 4 to about 6 carbons), and $R_2$ is an alkyl moiety or hydrocarbon chain with 1 to 20 carbons (in other approaches, about 1 to 8 carbon, and in yet further approaches, about 1 to about 4 carbons), or $R_2$ is an alkyl carbamate moiety end capped with an alkyl chain with 1 to 10 carbons (in other approaches, about 1 to about 4 carbons). In some approaches, $R_2$ is a linear alkyl chain. The functionalized (meth)acrylate polymer may include about 0.1 to about 20 mol percent of the urethane (meth)acrylate monomer units, in other approaches, about 2 to about 10 mol percent, and in yet other approaches, about 2 to about 5 mol percent of the urethane (meth)acrylate monomer units. A monomer mixture used to polymerize the polymers herein may also include such mol percent of the urethane (meth)acrylate monomer for polymerization. The $R_2$ moiety of the urethane (meth)acrylate monomer or monomer unit may be an alkyl chain with 1 to 20 carbons and may include linear, branched, or cyclic hydrocarbons, but in some approaches is a linear alkyl chain having 1 to 4 carbons, and in other approaches, a methyl group. The hydrocarbons may be a saturated or an unsaturated alkyl chain. The chain may be substituted or unsubstituted as needed for a particular application. In other approaches, the $R_2$ organic group may include from about 1 to about 12 carbon atoms, in other approaches, from about 2 to about 10 carbon atoms, and in yet other approaches, about 2 to about 8 carbon atoms. Exemplary hydrocarbon groups for $R_2$ include, but are not limited to, methyl, ethyl, propyl, isopropyl, isobutyl, tert-butyl, n-butyl, sec-butyl, isopentyl, tertpentyl, n-pentyl, sec-pentyl, tert-hexyl, n-hexyl, iso-hexyl, sec-hexyl, n-heptyl, n-octyl, n-nonyl, n-decyl, n-dodecyl, and mixtures thereof.

The $R_2$ moiety may also be an alkyl carbamate end capped with an alkyl chain of the formula where $R_3$ is bonded to the nitrogen in the urethane (meth) acrylate and may be a linear, branched, or functionalized alkylene or hydrocarbon chain having 1 to 10 carbons (in other approaches, 4 to 8 carbons, and in yet other approaches, 4 to 6 carbons), and $R_4$ is a linear, branched, or functionalized alkyl chain end cap having 1 to 10 carbons (in other approaches, 1 to 4 carbons.) $R_4$ may also be a linear alkyl chain and, in other approaches, a methyl group. Exemplary hydrocarbon groups for $R_3$ and $R_4$ include, but are not limited to, methyl, ethyl, propyl, isopropyl, isobutyl, tert-butyl, n-butyl, sec-butyl, isopentyl, tertpentyl, n-pentyl, sec-pentyl, tert-hexyl, n-hexyl, iso-hexyl, sec-hexyl, n-heptyl, n-octyl, n-nonyl, n-decyl, n-dodecyl, and mixtures thereof (or the equivalent alkylene moiety thereof).

In other approaches, the urethane (meth)acrylate monomer and monomer units of the resultant polymer may have the following formulas:

where $R_1$, $R_3$, and $R_4$ are as described above.

In one approach, a suitable urethane (meth)acrylate monomer may be 6-((methylcarbamoyl)oxy) hexyl methacrylate. Such monomer may be obtained from the reaction product of methylamine and 1,3-dioxonan-2-one to form 6-hydroxyhexyl methylcarbamate. The 6-hydroxyhexyl methycarbamate is then further reacted with methacryloyl chloride in the presence of trimethylamine (TEA), 4-Dimethylaminopyridine (DMAP), and hydroquinone to form the 6-((methylcarbamoyl)oxy)hexyl methacrylate. Such monomers tend to increase the flexibility between the urethane and methacrylate group by increasing the length of the $R_1$ chain to 4 or greater carbons In another approach, a suitable urethane (meth)acrylate monomer may be prepared in an acrylic solution (solventless or with minimal amount of acetone that can be stripped off at the end) with hydroxyethyl methacrylate (HEMA). Hexamethylene diisocyanate (HDI) can be added dropwise to the solution and then end capped with methanol or other longer alkyl chain alcohol to form an exemplary urethane (meth)acrylate monomer. The water reducible latex will be neutralized and dispersed in water.

In another aspect, the functionalized (meth)acrylate polymers of the present disclosure, in addition to the urethane (meth)acrylate, may further include optional monomer units in the polymer. For instance, the polymer may include acrylic, styrene acrylic, or vinyl acrylic monomer units or blends thereof including ethylenically unsaturated monomers with at least carboxylic acid, alkyl acrylate, alkyl methacrylate, and/or acetate moieties. The polymer may include as polymerizable or monomer units in a polymer backbone vinyl monomers and acrylic monomers such as at least vinyl acetate, alkyl acrylate, alkyl methacrylate, acrylic acid, styrene acrylic, and combinations thereof. Alkyl groups of such monomers may have chain lengths from 1 to 12 carbons and, in some approaches, are methyl, ethyl, propyl, isopropyl, n-butyl, t-butyl and the like side groups.

In some approaches, the vinyl monomers or monomer units are selected from the group consisting of vinyl esters, vinyl aromatic hydrocarbons, vinyl aliphatic hydrocarbons, vinyl alkyl ethers and mixtures thereof. Examples of vinyl esters that may be used include vinyl acetate, vinyl propionate, vinyl laurate, vinyl pivalate, vinyl nonanoate, vinyl decanoate, vinyl neodecanoate, vinyl butyrates, vinyl benzoates, and vinyl isopropyl acetates. Examples of vinyl aromatic hydrocarbons that may be used include styrene, methyl styrenes and other lower alkyl styrenes, chlorostyrene, vinyl toluene, vinyl naphthalene and divinyl benzene. Examples of vinyl aliphatic hydrocarbons that may be used include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexene, cyclopentadiene, and dicyclopentadiene. Examples of vinyl alkyl ethers that may be used include methyl vinyl ether, isopropyl vinyl ether, n-butyl vinyl ether, and isobutyl vinyl ether.

In other approaches, acrylic monomers or monomer units suitable for use in the polymers of the present disclosure include any compounds having acrylic functionality. Preferred acrylic monomers are selected from the group consisting of alkyl (meth)acrylates, acrylic acids, as well as aromatic derivatives of (meth)acrylic acid, acrylamides and acrylonitrile. Typically, the alkyl (meth)acrylate monomers (also referred to herein as "alkyl esters of (meth)acrylic acid") will have an alkyl ester portion containing from 1 to 12, preferably about 1 to 5, carbon atoms per molecule.

Suitable acrylic monomers or monomer units include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth)acrylate, isodecyl (meth)acrylate, benzyl (meth)acrylate, isobornyl (meth)acrylate, neopentyl (meth)acrylate, 1-adamatyl methacrylate and various reaction products such as butyl, phenyl, and cresyl glycidyl ethers reacted with (meth)acrylic acid, hydroxyl alkyl (meth)acrylates, such as hydroxyethyl and hydroxypropyl (meth)acrylates, amino (meth)acrylates, as well as acrylic acids such as (meth)acrylic acid, ethacrylic acid, alpha-chloroacrylic acid, alpha-cycanoacrylic acid, crotonic acid, beta-acryloxy propionic acid, and beta-styryl acrylic acid.

As mentioned previously, "(meth)acrylate" monomer(s) and monomer unit(s) include both acrylate monomer(s) and monomer unit(s) and methacrylate monomer(s) and monomer unit(s) as well as functionalized (meth)acrylate monomer(s) or monomer unit(s) suitable for incorporation into the functionalized polymers disclosed herein. Other examples of suitable (meth)acrylate monomers or monomer units include, but are not limited to, alkyl (meth)acrylates, including methyl methacrylate, butyl acrylate, 2-ethylhexylacrylate, C12/C18 alkylacrylate, polyethyleneglycol acrylate or diacrylate, acetoacetoxyethyl acrylates, diacetone acyl halides, benxophenone (meth) acrylates, etc. Additionally, vinylic monomers or other monomers may be functionalized or bear functional moieties that are utilized in post application functions, such as cross-linking, light or heat induced grafting. Functional moieties may also bear crosslinking groups, photo-reactive groups, anti-fouling agents, light absorbers, anti-corrosion agents, and the like.

In addition to the urethane (meth)acrylate monomers and monomer units described above, the functionalized polymers herein may also include about 0 to about 10 mol percent acrylic acid (in other approaches, about 0.2 to about 10 mol percent acrylic acid and, in other approaches, about 1 to about 2 mol percent acrylic acid), about 0 to about 97 mol percent alkyl(meth)acrylate (in other approaches about 0 to about 50 mol percent, and in yet other approaches, about 20 to about 30 mol percent alkyl (meth)acrylate), and about 25 to about 90 mol percent vinyl acetate (in other approaches, about 65 to about 85 mol percent vinyl acetate). These monomers and associated monomer units are randomly polymerized in the polymer chains along with the urethane (meth)acrylate monomer discussed above.

Polymer Properties

The functionalized urethane (meth)acrylate polymers have higher glass transition (Tg) temperatures compared to minimum film formation temperatures (MFFT). In one approach, the polymers herein have a Tg of about 17° C. or greater and, in other approaches, about 17° C. to about 40° C., in yet further approaches, about 17 to about 30° C., or about 19° C. to about 25° C., and in yet further approaches, about 20 to about 25° C. where all temperatures are measured by DSC. At the same time, the functionalized urethane (meth)acrylate polymers also have a low minimum film forming temperature (MFFT) of about 12° C. or lower and, in other approaches, about 10° C. or lower. In yet further instances, the polymers may also have a MFFT of about 12°

C. to about 0° C. or about 10° C. to about 2° C., in other approaches, about 12° C. to about 5° C. or about 10° C. to about 5° C., and in yet other approaches, about 7° C. to about 12° C. or about 7° C. to about 10° C., as measured by a Rhopoint MFFT 90 Instrument. Preferably, the polymer has at least about a 5° C. difference between the Tg and MFFT, and in other approaches, about 5° C. to about 40° C. difference between the higher Tg and the lower MFFT of the polymer.

The functionalized urethane (meth)acrylate polymers herein also have excellent block resistance according to ASTM D4946-89 after a 7 day air dry and over 1 to 24 hours of block testing. In some aspects, dramatic block resistance is observed with as little as 2 mol percent of the urethane (meth)acrylate monomers with ratings of 4 or above according to the ASTM testing.

The functionalized urethane (meth)acrylate polymers may have a weight average molecular weight of about 100,000 to about 1,000,000 and in other approaches, about 200,000 to about 750,000. The urethane methacrylate monomer discussed herein may be about 0.1 to about 20 mol percent of the functionalized polymer and providing the hydrogen bonding sites for the improved coalescence as discussed herein. Thus, in some approaches, the overall latex polymer may have about 0.004 to about 3 mol percent of sterically available hydrogen bonding sources or sites provided by the side chains of the urethane (meth)acrylate. In these approaches, the hydrogen bonding sources are not found in the backbone of the polymer, but in the side chains extending from the polymer backbone.

Figure 1:
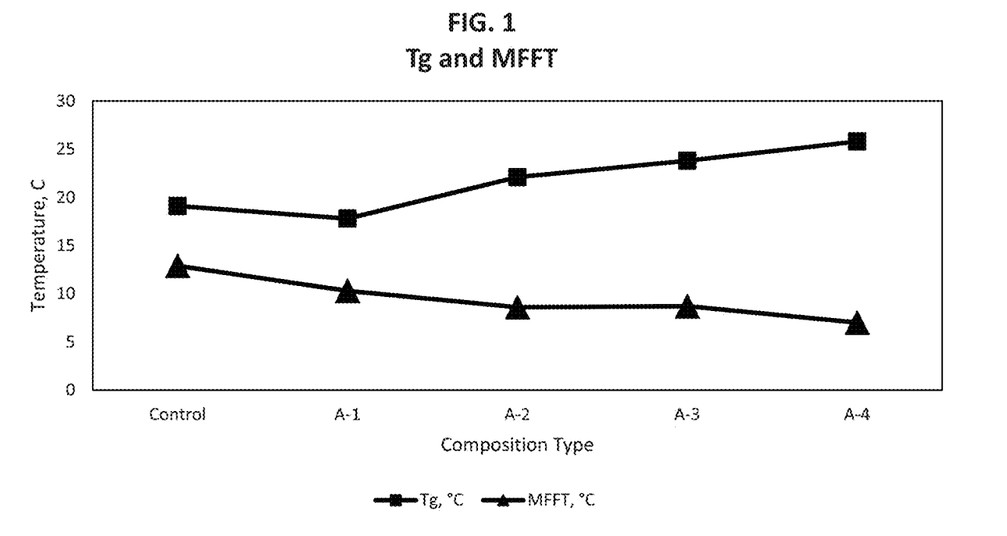
FIG. 1 is a graph of glass transition temperature as measured by DSC and minimum film forming temperature of polymers herein relative to a control polymer without a urethane (meth)acrylate.
Figure 2:
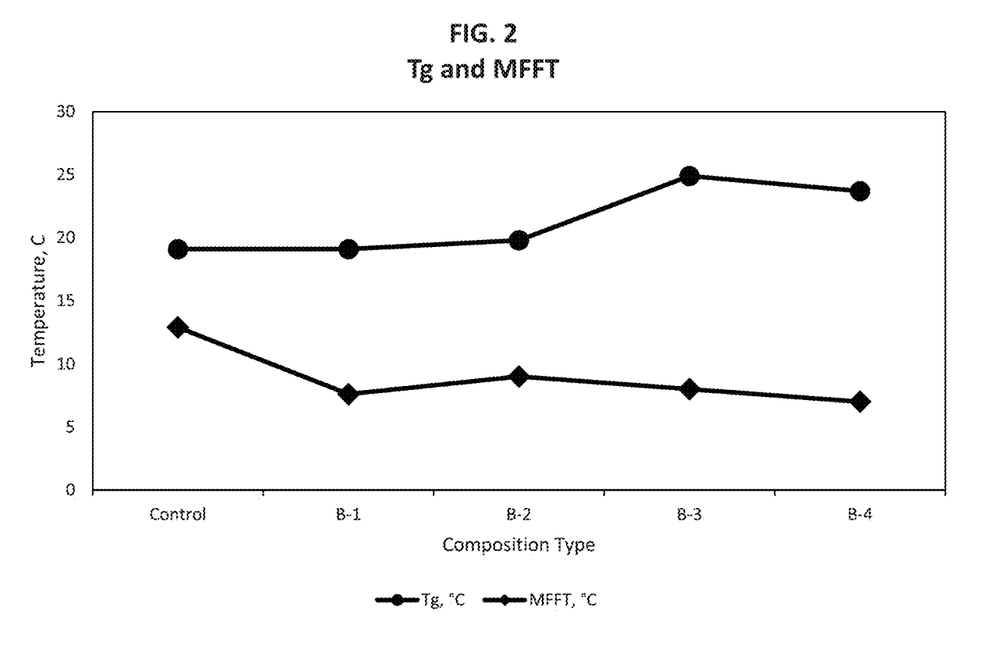
FIG. 2 is another graph of glass transition temperature as measured by DSC and minimum film forming temperature of polymers herein relative to a control polymer without a urethane (meth)acrylate.

The functionalized polymers herein including the urethane (meth)acrylate monomers also have the ability to control or dial-in desired film formation properties. For example and as generally shown in FIGS. 1 and 2, the selection of any particular Tg and MFFT can be controlled using the amount of the urethane (meth)acrylate monomer in the polymer in view of the relatively linear relationship between these properties and the amount of urethane (meth)acrylate. The monomer is advantageous because it allows the polymer to include other monomers to provide an increased Tg and achieve the desired hardness and blocking in a latex composition, but also permits selection of lower MFFT at the same time depending on the application and other requirements of the coating. The ability to control such diametrically opposed properties of a latex coating without using substantial levels of the co-solvents, plasticizers, and coalescence aids as discussed herein is surprising and unexpected.

Co-Solvents, Plasticizers, and Coalescent Aids

The water-based emulsions and latexes herein are substantially free of co-solvents, plasticizers, and/or coalescent aids. As used herein, potential co-solvents include, but are not limited to, acetone and butyl acetate. Coalescent aids or coalescing agents include, but are not limited to, ethylene glycol, ethylene glycol phenyl ether, propylene glycol, hexylene glycol, 2,2,4-trimethyl-1,3-pentanediol monoisobutyreate (Texanol), glycol ethers, mineral spirits, methyl carbitol, butyl carbitol, phithalates, adipates, and the like, and mixtures thereof. As mentioned above, substantially free of, in the absence of, or devoid of such components individually and in various combinations thereof generally means less than about 1 weight percent, in other approaches, less than about 0.5 weight percent, in other approaches, less than about 0.2 weight percent, and in yet other approaches, no co-solvents, plasticizer, and coalescent aids in the coating or paint.

Other Monomers or Polymers

The functionalized urethane (meth)acrylate polymer (or other polymer of the present disclosure) may include other optional monomer units polymerized into the polymer backbone or as additional, separate polymers as needed for a particular application. For instance, the backbone including the functionalized polymers herein (or a separate polymer) may further include ureido monomers, amino monomers, sulfonate monomers or surfactants, silane monomers, phosphate monomers or surfactants, carboxyl monomers or surfactants, and combinations thereof. In some approaches, the copolymer may further include vinyl monomers such as allyl imidazolidinone, allyl acetoacetates, allyl epoxies, epoxy acrylates, carbonyl monomers, other sulfonates, other phosphonates, vinyl phosphonate, allyl hydroxypopyl sodium sulfonate, allyloxy hydroxypropyl sodium sulfonate, and combinations thereof as needed for a particular application. In some approaches, for instance, the other monomers in a polymer, copolymer, or terpolymer of the present disclosure, if included, may be in amounts up to about 10 weight percent, and in other approaches, about 0.1 to about 5 weight percent, in other approaches, about 0.5 to about 2 weight percent, but the amounts may vary depending on the particular application. In other approaches, the other or additional monomers may each be included in a polymer backbone in amounts less than about 1 weight percent. In other approaches, a polymer may also include up to about 1 weight percent of ally imidazolidinone monomer to aid in the wet adhesion of the paint composition and up to about 1 weight percent of allyl hydroxypropyl sodium sulfonate monomer for stability to provide mechanical and thermal stability to the polymer and paint composition. In some approaches imidazolidone, sulfonate, and/or amide monomers are not needed.

Pigment or Inorganic Particle

The coatings and emulsions of the present disclosure may also include a pigment or inorganic particle. Suitable pigment particles or inorganic particles used in the compositions of the present disclosure may be titanium dioxide ($TiO_2$), zinc oxide ($ZnO_2$), calcium carbonate ($CaCO_3$), talc, clay materials, aluminum oxide, silicon dioxide, magnesium oxide, zinc sulfate, sodium oxide, potassium oxide, combinations thereof, or other known pigment or inorganic particles suitable for paints and other coatings. In some approaches, the pigment or inorganic particle is titanium dioxide, which may comprise anatase titanium dioxide or rutile titanium dioxide, or a mixture of the two. In other approaches, the pigment or inorganic particle comprises rutile titanium dioxide, to the exclusion of anatase titanium dioxide. In some approaches, the rutile titanium dioxide is surface treated with an inorganic oxide, such as silica ($SiO_2$). Generally, titanium dioxide has a particle size of from about 0.2 to about 0.3 microns in diameter and is provided in powder form, or in an aqueous slurry. An example of a titanium dioxide that is suitable for use in the present invention is Ti-Pure® R-706, which is commercially available from E.I. du Pont de Nemours and Company. Ti-Pure® R-706 titanium dioxide is a rutile titanium dioxide that is surface treated with silica. Pigment or pigment particles include both organic, inorganic, and extender pigment particles. For example, titanium dioxide, zinc oxide, magnesium oxide, and potassium oxide are examples of inorganic pigment particles; clay, aluminum silicate, silicon, calcium carbonate, and talc, magnesium silicate, silicon dioxide are often considered extender pigment particles; and opaque polymers as discussed previously may be considered organic pigment particles. Depending on the type of latex coating, the PVC of the coating may be less than about 80, in other approaches, about 35 to about 80, in other approaches, about 60 to about 75, in other approaches, about 30 to about 50, and in yet other approaches, about 20 to about 50.

Preparation of Polymer Compositions and Latex Paint Compositions

The present disclosure also includes methods of making the polymer and coatings herein. If needed, the polymers can be synthesized through conventional emulsion polymerization techniques, and the paint composition can be prepared using standard mixing methods for paint and coatings manufacture. For instance, the coatings using the polymers of the present disclosure may be produced using conventional latex paint forming techniques including a grind and letdown process as known to those skilled in the art of manufacturing paint and coatings. In addition to the polymer component or binder latex described above (which may be the sole binder latex in the paints), an optional dispersant latex, an optional extender, and an optional thickener, the water-borne coating composition may contain conventional additives such as coalescing aids, biocides, anti-foaming agents, freeze-thaw additives, rheology modifiers, surfactants, preservatives, and the like and combinations thereof. It should also be appreciated that in addition to the pigment and the extender, small amounts of other pigments or colorants may be used to provide desired coloration or to confer other optical effects.

EXPERIMENTAL

The following examples demonstrate the preparation of polymers and paint compositions such as those described hereinabove. The examples are intended to be representative of the polymers and compositions that can be made and are not intended to limit the scope of the present disclosure to the specific illustrative examples disclosed below. All percentages, ratios, and amounts in this disclosure are by weight unless otherwise specified.

Example 1

Two different functionalized urethane (meth)acrylate polymers were evaluated for glass transition temperature (Tg), minimum film forming temperature (MFFT), and film formation. In this Example, polymer A included various amounts of butyl-ethyl urethane methacrylate (BE-UMA) with other monomers including methyl methacrylate and butyl acrylate. Polymer B included methyl-ethyl urethane methacrylate (ME-UMA) with other monomers including methyl methacrylate and butyl acrylate. The control polymer included butyl acrylate and methyl methacrylate monomers without urethane methacrylate and adjusted to have similar Tg. The polymer compositions were neat and did not include any co-solvents, plasticizers, and coalescent aids. Test results of the polymer are shown in Table 1 below, the Graphs of FIGS. 1 and 2, as well as atomic force microscopy (AFM) images shown in FIGS. 3A, 3B, and 3C.

TABLE 1

| Sample ID | BE-UMA, mol % | ME-UMA, mol % | Tg, ° C. | MFFT, ° C. | Delta, ° C. |
|---|---|---|---|---|---|
| Control | 0 | 0 | 19.1 | 12.9 | 6.2 |
| A-1 | 2 | 0 | 17.8 | 10.3 | 7.5 |
| A-2 | 5 | 0 | 22.1 | 8.6 | 13.5 |
| A-3 | 10 | 0 | 23.8 | 8.7 | 15.1 |
| A-4 | 20 | 0 | 25.8 | 7.0 | 18.8 |
| B-1 | 0 | 2 | 19.1 | 7.6 | 11.5 |

TABLE 1-continued

| Sample ID | BE-UMA, mol % | ME-UMA, mol % | Tg, ° C. | MFFT, ° C. | Delta, ° C. |
|---|---|---|---|---|---|
| B-2 | 0 | 5 | 19.8 | 9.0 | 10.8 |
| B-3 | 0 | 10 | 24.9 | 8.0 | 16.9 |
| B-4 | 0 | 20 | 23.7 | 7.0 | 16.7 |

Glass transition temperature was measured by differential scanning calorimetry (DSC) using a TA Instruments DSC Q200 Differential Scanning calorimeter, and minimum film forming temperature is measured by Rhopoint MFFT-90 Instrument.

As shown in FIGS. 3A, 3B, and 3C, the AFM images evidence the improved homogeneity and film formation of the polymers herein. FIG. 3A is an AFM image of the control sample of Table 1 without urethane methacrylate and having a Tg of about 19.1° C., a MFFT of 12.9° C. and a delta therebetween of about 6° C. FIG. 3B is an AFM image of sample A-1 of Table 1 having about 2 mol percent of the butyl-ethyl methacrylate (BE-UMA) and shows an improved film formation as evidenced by the smoother or more homogeneous surface relative to FIG. 3A and as evidenced by the Tg of about 17.8° C., the lowered MFFT of about 10.3° C., and the increased delta therebetween of about 7.5° C. Lastly, FIG. 3C shows an AFM image of sample B-1 having about 2 mol percent of the methyl-ethyl methacrylate (ME-UMA) and shows a homogeneous and smooth surface relative to the other figures and as evidenced by the high Tg of about 19.1° C., the low MFFT of about 7.6° C., and the large delta there between of about 11.5° C. FIG. 3C shows how the functionalized polymers herein are also capable of achieving a homogenous film with a relatively uniform or smooth surface in terms of homogenous composition, adhesion, friction, and viscoelasticity of the surface using the polymers herein and without the need for co-solvents, plasticizers, and coalescence aids. The functionalized polymers herein are capable of a homogeneous film generally without the existence of visible discrete particles as generally shown in the example of FIG. 3C. The graphs of FIGS. 1 and 2 show the relatively linear and divergent properties of Tg and MFFT as the level of the UMA increases.

Example 2

The polymers B-1 to B-4 from Example 1 including the ME-UMA monomer were further evaluated for blocking resistance according to ASTM D4946-89. The results are provided in Table 2 below. Block resistance is vastly improved by using only 2 mol percent of the ME-UMA monomer in the polymeric binder. The rest of the polymer composition in the 2 mol percent ME-UMA sample includes 49.4 weight percent (0.395 mol) methyl methacrylate (MMA) and 47.3 weight percent (0.295 mol) butyl acrylate (BA).

TABLE 2

| Sample ID | ME-UMA, mol %, | Block Resistance Rating 1-5 (with 5 best) | | |
|---|---|---|---|---|
| | | 1 hour | 6 hours | 24 hours |
| Control | 0 | 2 | 0 | 0 |
| B-1 | 2 | 5 | 4 | 4 |
| B-2 | 5 | 5 | 5 | 5 |

TABLE 2-continued

| Sample ID | ME-UMA, mol %, | Block Resistance Rating 1-5 (with 5 best) | | |
|---|---|---|---|---|
| | | 1 hour | 6 hours | 24 hours |
| B-3 | 10 | 5 | 5 | 5 |
| B-4 | 20 | 5 | 5 | 5 |

Unless otherwise specified, all measurements herein are made at 23±1° C. and 50% relative humidity. All publications, patent applications, and issued patents mentioned herein are hereby incorporated in their entirety by reference. Citation of any reference is not an admission regarding any determination as to its availability as prior art to the claimed invention.

The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described, hereinabove. It will be apparent to those skilled in the art that the above devices and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A low VOC latex coating composition for improved coalescence of water-based emulsions, the low VOC latex coating composition comprising:
    a polymer obtained from monomers including one or more of a vinyl acetate monomer, an alkyl (meth)acrylate monomer, a styrenic monomer, or combinations thereof together with a urethane (meth)acrylate monomer;
    the urethane (meth)acrylate monomer providing about 4 to about 15 percent of sterically available hydrogen bonding sites per urethane (meth)acrylate monomer;
    the urethane (meth)acrylate monomer having the formula:

wherein R is hydrogen or a methyl group, $R_1$ is an alkylene chain with 1 to 10 carbons, $R_2$ is an alkyl chain with 1 to 3 carbons or an alkyl carbamate having an alkyl endcap with 1 to 4 carbons, and $R_4$ is an alkyl chain with 1 to 4 carbons;
    the polymer having a glass transition temperature as measured by differential scanning calorimetry of about 17° C. or greater and a minimum film forming temperature of about 12° C. or lower at the same time;
    water;
    one or more of inorganic pigment particles, opaque polymer particles, or extender pigment particles; and
    wherein the low VOC latex coating composition is substantially free of co-solvents, plasticizers, coalescence aids, and mixtures thereof.

2. The low VOC latex coating composition of claim 1, wherein the low VOC latex coating composition includes the inorganic pigment particles and wherein the inorganic pigment particles include one of titanium dioxide, zinc oxide, magnesium oxide, potassium oxide, or combinations thereof.

3. The low VOC latex coating composition of claim 1, wherein the urethane (meth)acrylate monomer provides about 2 to about 9 percent sterically available hydrogen bonding sites that are spaced 1 to 3 carbon atoms from a terminal end of the urethane (meth)acrylate monomer.

4. The low VOC latex coating composition of claim 1, wherein the coating composition, when dry, forms a homogeneous film at the minimum film forming temperature of about 12° C. or lower and being substantially free of the co-solvents, plasticizers, coalescence aids, and mixtures thereof at least in part by a coalesced polymer network including amide nitrogen to carbonyl oxygen hydrogen bonds between polymer particles therein.

5. The low VOC latex coating composition of claim 1, wherein the $R_2$ group is a linear alkyl chain.

6. The low VOC latex coating composition of claim 1, wherein the low VOC latex coating composition has less than about 0.5 weight percent of the co-solvents, plasticizers, coalescence aids, and mixtures thereof.

7. The low VOC latex coating composition of claim 1, wherein the polymer includes about 2 to about 20 mol percent of the urethane (meth)acrylate monomer units.

8. The low VOC latex coating composition of claim 1, wherein $R_2$ is an alkyl carbamate moiety of the formula wherein $R_3$ is an alkylene chain with 1 to 6 carbons and $R_4$ is an alkyl chain with 1 to 4 carbons.

9. The low VOC latex coating composition of claim 1, wherein the polymer has a glass transition temperature as measured by differential scanning calorimetry of about 17 to about 40° C. and a minimum film forming temperature of about 0 to about 12° C.

10. The low VOC latex coating composition of claim 9, wherein a difference between the glass transition temperature as measured by differential scanning calorimetry and the minimum film forming temperature is at least about 5° C.

11. The low VOC latex coating composition of claim 1, wherein a difference between the glass transition temperature as measured by differential scanning calorimetry and the minimum film forming temperature is about 5° C. to about 40° C.

12. The low VOC latex coating composition of claim 1, wherein the low VOC latex coating composition has a VOC of about 5 g/L or less.

13. The low VOC coating composition of claim 1, wherein a dried coating thereof exhibits a blocking resistance of 4 or higher as measured by ASTM D4946-89.

14. A low VOC latex coating composition for improved coalescence of water-based emulsions, the low VOC latex coating composition comprising:
- a polymer obtained from monomers including one or more of a vinyl acetate monomer, an alkyl (meth) acrylate monomer, a styrenic monomer, or combinations thereof together with a urethane (meth)acrylate monomer;
- the urethane (meth)acrylate monomer providing about 4 to about 15 percent of sterically available hydrogen bonding sites per urethane (meth)acrylate monomer;
- the polymer having a glass transition temperature as measured by differential scanning calorimetry of about 17° C. or greater and a minimum film forming temperature of about 12° C. or lower at the same time;
- water;
- one or more of inorganic pigment particles, opaque polymer particles, or extender pigment particles;
- wherein the low VOC latex coating composition is substantially free of co-solvents, plasticizers, coalescence aids, and mixtures thereof; and
- wherein the polymer includes the vinyl acetate monomer, the alkyl (meth)acrylate monomer, and the urethane (meth)acrylate monomer.

15. The low VOC coating composition of claim 14, wherein the polymer includes about 2 to about 20 mol percent of the urethane (meth) acrylate monomer, about 20 to about 97 mol percent of the alkyl (meth)acrylate monomer, and about 20 to about 90 mol percent of the vinyl acetate monomer.

16. The low VOC latex coating composition of claim 15, wherein the polymer further includes about 0.2 to about 10 mol acrylic acid.

17. The low VOC latex coating composition of claim 14, wherein a difference between the glass transition temperature as measured by differential scanning calorimetry and the minimum film forming temperature is about 5° C. to about 40° C.

18. The low VOC latex coating composition of claim 14, wherein the low VOC latex coating composition has a VOC of about 5 g/L or less.

19. The low VOC latex coating composition of claim 18, wherein the low VOC latex coating composition has less than about 0.5 weight percent of the co-solvents, plasticizers, coalescence aids, and mixtures thereof.

* * * * *